Aug. 18, 1959     N. SOREL ET AL     2,900,519
VARIABLE SPEED DRIVE FOR SPIRAL SCANNER
Filed March 31, 1954     3 Sheets-Sheet 1
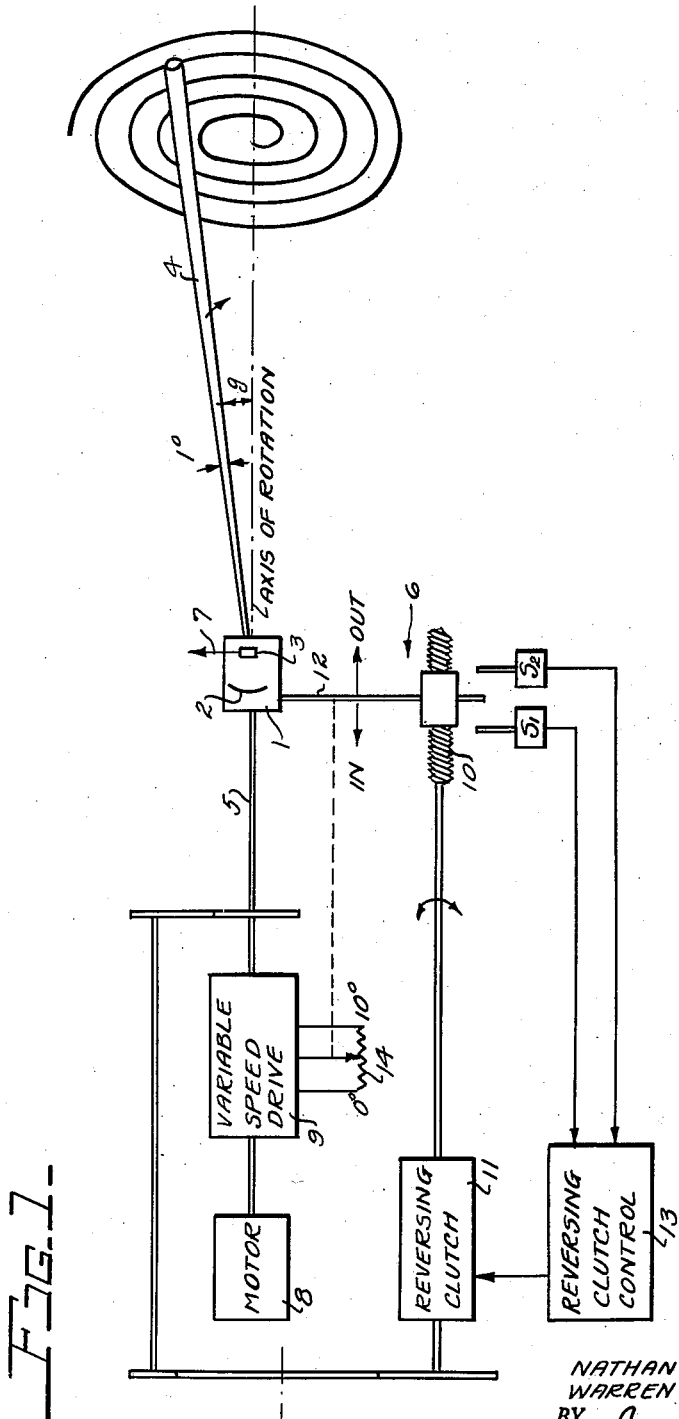
INVENTORS.
NATHAN SOREL
WARREN A. WIENER

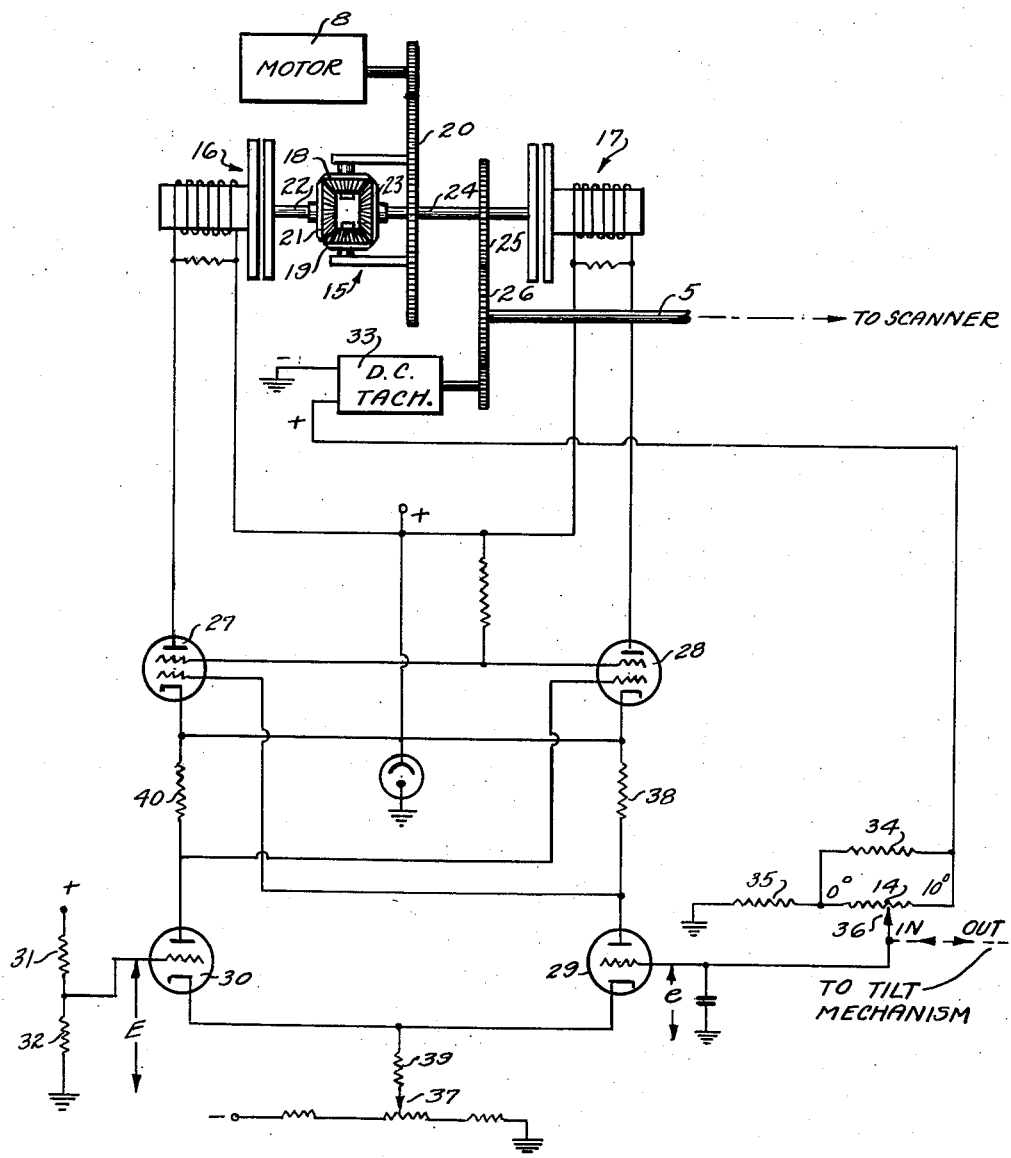

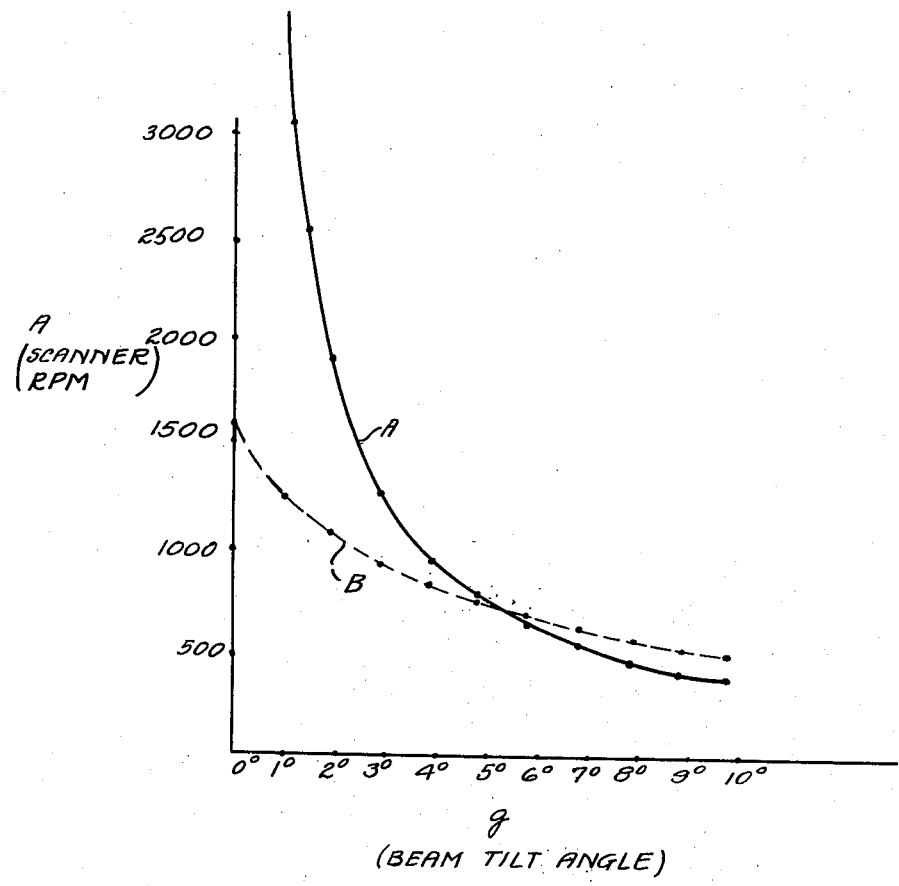

United States Patent Office 2,900,519
Patented Aug. 18, 1959

2,900,519

VARIABLE SPEED DRIVE FOR SPIRAL SCANNER

Nathan Sorel, Carle Place, and Warren A. Wiener, Islip, N.Y., assignors to the United States of America as represented by the Secretary of the Air Force Application March 31, 1954, Serial No. 420,214

2 Claims. (Cl. 250—83.3)

This invention relates to spiral scanning systems of the type in which the scanning beam generates a cone of continuously varying apex angle. In such scanning systems the scanning head, which produces the scanning beam, is rotated about an axis fixed relative to the scanner and at the same time the tilt angle of the beam relative to the axis of rotation is varied back and forth between zero and a predetermined maximum value. This results in a spiral scanning pattern in planes perpendicular to the axis of rotation.

It is evident that the writing speed or tangential velocity of the beam in a spiral scan varies widely from low values of tilt angle to high values if the beam is rotated at constant speed. For example, if the maximum tilt angle is 10°, the writing speed at 10° is approximately ten times that at 1°. In target seekers of the heat sensitive type the amplitude and duration of the signal produced when the beam intercepts a target are directly related to the dwell time of the target on the bolometer. Accordingly, in the above example, a target at 1° tilt would dwell on the bolometer element approximately ten times as long as a target at 10°. For uniform sensitivity the dwell should be equal over the entire scanned field. Accordingly, it is the object of this invention to provide means for producing uniform beam writing speed in a spiral scan. This is an ideal situation, however, and is difficult to achieve due to the high inertia of the rotating mass and the resulting high power required to effect the necessary acceleration during one scanning frame. As a practical matter, therefore, the dwell time is made equal to the bolometer time constant at mid-field and the tangential speed range reduced to about 3:1.

Briefly, this is accomplished by a variable speed drive for the scanner which is controlled by the tilt mechanism. The control is such that the scanner has its maximum rotational speed when the beam tilt angle is zero and its minimum rotational speed when the beam tilt angle is at its maximum value.

A more detailed description of the invention will be given in connection with the specific embodiment thereof shown in the accompanying drawings, in which—

Fig. 1 is a block diagram of a spiral scanning mechanism with variable speed drive in accordance with the invention;

Fig. 2 shows the details of the variable speed drive; and

Fig. 3 shows speed control characteristics for uniform writing speed and a writing speed range of about 3:1.

Referring to Fig. 1, which shows the general application of the invention to a spiral scanner for use in an infra-red sensitive target seeker, the scanning head 1 contains a mirror 2 and a bolometer 3 positioned in front of the mirror to receive reflections of infra-red energy from any source thereof intercepted by the scanning beam 4. The mirror is rotated by shaft 5 and at the same time the angle $g$ between its optical axis and the axis of rotation is varied cyclically from zero to a maximum value, for example 10°, and back to zero by tilt mechanism 6.

The sum of these movements causes the beam, which always rotates in the same direction, to describe inward and outward spirals in a plane perpendicular to the axis of rotation. An inward spiral is shown in Fig. 1. The bolometer may either be attached to the mirror and positioned at its focal point, in which case the mirror tilt angle equals the beam tilt angle $g$, or the bolometer may be supported on the frame of the scanner in a fixed position, in which case the mirror tilt angle equals one-half the beam tilt angle $g$. The latter method results in less uniform sensitivity over the scanned field but avoids the bolometer microphonics due to attaching the bolometer to the rotated and tilted mirror. The output of the bolometer is applied over conductor 7 to the target information processing portion of the seeker, not shown.

Shaft 5, which rotates mirror 2, is driven by motor 8 through variable speed drive 9. Tilt mechanism 6 comprises a lead screw 10 which is driven from shaft 5 through suitable gearing and reversing clutch 11. Tilting of the beam is accomplished through arm 12 by rotation of lead screw 10 in either direction. Assuming the beam to be spirally inwardly as shown, limit switch $S_1$ closes when $g=0$ and, acting through reversing clutch control 13 and reversing clutch 11, reverses the direction of rotation of lead screw 10. The beam then spirals outwardly until $g$ reaches its maximum value, in this case 10°, at which point limit switch $S_2$ closes again reversing lead screw 10 and initiating the next inward spiral.

As already stated, if the mirror is rotated at constant speed, the writing speed or tangential velocity of the beam is approximately proportional to $g$, which, in the example shown, means about a 10:1 variation in writing speed and target dwell over the scanned area. If V is the writing speed, and A the revolutions-per-minute of the mirror, the exact expression for the range of writing speeds is $$(1) \qquad \frac{V \max}{V \min} = \frac{\tan g \max\ A \min}{\tan g \min\ A \max}$$

since the tangent of an angle not greater than 10° is substantially proportional to the angle this ratio is substantially equal to $$(2) \qquad \frac{g \max\ A \min}{g \min\ A \max}$$

Therefore, for values of $g$ ranging from 1° to 10° the ratio of writing speeds is $$(3) \qquad \frac{10A \min}{A \max}$$

To reduce the above writing speed ratio to a satisfactory value the mirror 2 is driven from the variable speed drive 9 which is controlled by the tilt mechanism through actuation of control potentiometer 14. The control is such that shaft 5 has its maximum rotational speed when $g$ is zero and its minimum rotational speed when $g$ has its maximum value, in this case 10°.

The details of the variable speed drive are shown in Fig. 2. Speed control of shaft 5 is accomplished through the action of differential gear 15 and magnetic brakes 16 and 17. The spider of the differential, which carries pinions 18 and 19, is driven at constant speed by motor 8 through gear 20. Magnetic brake 16 is connected to output gear 21 through shaft 22, while magnetic brake 17 is connected to output gear 23 by shaft 24 which passes freely through gear 20. Output shaft 5 is driven at the same speed as shaft 24 by 1:1 gears 25—26. The magnetic brakes are designed to be applied when their coils are energized. If brake 16 is applied and brake 17 released, output shaft 5 rotates at twice the speed of spider gear 20, whereas, if brake 17 is applied and brake 16 released, the output shaft speed is zero. Therefore by alternate application of brakes 16 and 17 the speed of shaft 5 may be adjusted to any value between zero and twice the speed of gear 20.

The currents through the coils of brakes 16 and 17 are controlled by tubes 27 and 28, respectively, which are in turn controlled by a differential amplifier comprising tubes 29 and 30. A potentiometer 31—32 is provided for applying a positive reference voltage to the grid of tube 30. A voltage $e$ is applied to the grid of tube 29 that is directly related to the speed of shaft 5 and the beam tilt angle $g$. This voltage is derived from D.C. tachometer 33, which has a speed and output voltage proportional to the speed of shaft 5, and a voltage divider consisting of speed control potentiometer 14 and resistors 34 and 35. The amount of voltage division is controlled by tap 36 which is actuated by the tilt mechanism.

The operation of the variable speed control is as follows: Assume that contact 36 is fixed, that $e=E$ and that contact 37 has been adjusted to such position that the equal currents through tubes 27 and 28 are just below the operating threshold of brakes 16 and 17. For this condition brakes 16 and 17 are released and the load on shaft 5 tends to reduce its speed. Any reduction in the speed of shaft 5 however reduces the output of D.C. tachometer 33 and therefore reduces $e$. A reduction in $e$ reduces the bias on tube 27 from resistor 38 and causes the current in this tube to increase and apply brake 16. The decrease in $e$ has no effect on brake 17 since this decrease acts through resistor 39 to increase the potential of the grid of tube 30 relative to its cathode which increases the current through resistor 40 and, as a result, increases the bias on tube 28, so that the current through the coil of brake 17 is reduced still further below its threshold value. The braking of gear 21 causes the speed of shaft 5 and consequently $e$ to increase. The increase in $e$ reduces the current in tube 27 and, acting through resistor 39, increases the current in tube 28 until brake 16 is released and brake 17 is applied. This action slows shaft 5 and tends to again bring $e$ into equality with E. Therefore, for any position of contact 36, the control circuit tends to keep $e$ within a small range centered about E and the speed of shaft 5 within a small range centered about a speed determined by the value of E and the relative values of resistors 35 and 14—34. The extent of this range of variation is determined by the sensitivity of the control circuit, i.e., by the gain of the amplifiers.

If the position of contact 36 is changed the speed of shaft 5 changes accordingly. Assume that the tilt mechanism is operating in the outward direction so that $g$ is increasing. This results in contact 36 being moved to the right in Fig. 2 and $e$ to increase. The increase in $e$ reduces the current in tube 27 and increases the current in tube 28, in the manner explained above, so that brake 16 is released and brake 17 applied thus reducing the speed of shaft 5 until $e$ again equals E. This equality will now be attained at a lower speed of shaft 5 since $e$ now constitutes a greater portion of the output voltage of the D.C. tachometer than formerly. Conversely, if contact 36 is moved in the "In" direction the portion of the tachometer output voltage represented by $e$ is decreased and consequently a higher speed of shaft 5 is required to bring $e$ into equality with E. Movement of contact 36, therefore, varies the speed of shaft 5 from a maximum value at the 0° end of potentiometer 14 to a minimum value at the 10° end.

By suitable choice of reference voltage E and the dividing ratio of the voltage divider made up of resistors 35 and 14—34, various speed control characteristics may be obtained. In general, voltage E determines the speed operating region and the dividing ratio determines the range of speed variation. As seen from Expression 3 above a speed variation range of 10:1 is required to produce a uniform writing speed throughout the scanned field. Assuming a minimum speed of 400 r.p.m. and a frame period of 1 second, the rotating mirror would have to be accelerated between 400 r.p.m. and 4000 r.p.m. within one second. Since this would require considerable power it is more feasible from a practical standpoint to compromise between writing speed variation, power requirement and search frame period. For a beam width of 1° and values of $g$ not exceeding 10° the dwell time is substantially equal to (4) $$\frac{60,000}{2\pi gA} \text{ milliseconds}$$

where A is in r.p.m. and $g$ in degrees. For highest sensitivity the dwell time should be close to or exceed the bolometer time constant which is of the order of 2.5 milliseconds. Curve B of Fig 3 illustrates a compromise design in which the dwell time at $g=5°$ is 2.5 milliseconds, falling to 1.9 milliseconds at $g=10°$ and rising to 7.8 milliseconds at $g=1°$. A max is 1560 r.p.m. at $g=0°$ and 500 r.p.m. at $g=10°$ for a speed range of 3.2:1. The range of writing speeds is therefore 3.2:1. Curve A illustrates the speed control characteristic required for a uniform dwell time of 2.5 milliseconds.

We claim:

1. A spiral scanner comprising means forming a scanning beam, variable speed rotating means for rotating said scanning beam about an axis passing through said beam forming means and fixed relative to said scanner, means associated with said beam forming means for cyclically varying the tilt angle of said beam relative to said axis from a minimum value to a maximum value and back to said minimum value, means associated with said rotating means and said tilt angle varying means for establishing a voltage that is a direct function of both the speed of rotation of said beam and the tilt angle of said beam, and means responsive to said voltage and acting on said rotating means for maintaining said voltage constant by controlling the speed of rotation of said beam.

2. A spiral scanner comprising means forming a scanning beam, means for rotating said scanning beam about an axis passing through said beam forming means and fixed relative to said scanner, means associated with said beam forming means for cyclically varying the tilt angle of said beam relative to said axis from a minimum value to a maximum value and back to said minimum value, a differential gear, means for driving the spider of said differential gear at constant speed, means for braking one output gear of said differential gear, means for braking the other output gear of said differential gear, means for coupling said one output gear to said beam rotating means, means associated with said beam rotating means and said tilt angle varying means for generating a voltage that is a direct function of both the speed of rotation of said beam and the tilt angle of said beam, and means responsive to said voltage and acting on said braking means for applying the braking means of said one output gear when said voltage exceeds a predetermined value gear when said voltage falls below said predetermined value.

References Cited in the file of this patent
UNITED STATES PATENTS

| | | |
|---|---|---|
| 2,518,511 | White | Aug. 15, 1950 |
| 2,552,566 | Levine | May 15, 1951 |